United States Patent
Jeong

(10) Patent No.: US 10,366,063 B2
(45) Date of Patent: Jul. 30, 2019

(54) METHOD AND SYSTEM FOR DETECTING AND USING LOCATIONS OF ELECTRONIC DEVICES OF USERS IN A SPECIFIC SPACE TO ANALYZE SOCIAL RELATIONSHIPS BETWEEN THE USERS

(71) Applicant: LINE Corporation, Shibuya-ku, Tokyo (JP)

(72) Inventor: Ki Taek Jeong, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 207 days.

(21) Appl. No.: 15/223,728

(22) Filed: Jul. 29, 2016

(65) Prior Publication Data

US 2017/0132259 A1    May 11, 2017

(30) Foreign Application Priority Data

Nov. 9, 2015  (KR) ........................ 10-2015-0156835

(51) Int. Cl.
| | | |
|---|---|---|
| *G06F 16/00* | (2019.01) | |
| *G06F 16/22* | (2019.01) | |
| *G06F 16/9535* | (2019.01) | |
| *H04W 4/21* | (2018.01) | |
| *H04L 29/08* | (2006.01) | |

(52) U.S. Cl.
CPC ...... *G06F 16/2228* (2019.01); *G06F 16/9535* (2019.01); *H04W 4/21* (2018.02); *H04L 67/306* (2013.01)

(58) Field of Classification Search
CPC .................. G06F 17/30321; G06F 16/2228
USPC ........................................................ 707/741
See application file for complete search history.

(56) References Cited

U.S. PATENT DOCUMENTS

| 8,117,281 | B2 * | 2/2012 | Robinson ............... G06Q 10/10 |
| | | | 709/218 |
| 2012/0185540 | A1 * | 7/2012 | Hildorsson ........... H04W 8/186 |
| | | | 709/204 |
| 2013/0260893 | A1 | 10/2013 | Shin et al. |
| 2013/0332543 | A1 | 12/2013 | Shin et al. |

(Continued)

FOREIGN PATENT DOCUMENTS

| KR | 20120087287 A | 8/2012 |
| KR | 101523192 B1 | 5/2015 |
| WO | WO-2015/065001 A1 | 5/2015 |

OTHER PUBLICATIONS

Office Action for Corresponding Korean Patent Application No. 10-2015-0156835 dated Sep. 22, 2016.
Park, "Relational Approach for Social Network Analysis," 2012.

*Primary Examiner* — Chelcie L Daye
(74) *Attorney, Agent, or Firm* — Harness, Dickey & Pierce, P.L.C.

(57) ABSTRACT

A non-transitory computer-readable medium stores program code including instructions that, when executed by one or more processors, cause the one or processors to perform operations including storing and managing social network data in a social network database; receiving location information from a plurality of electronic devices associated with the social network data; specifying users of electronic devices present in a specific space at a specific time among the plurality of electronic devices; filtering relation information between the specified users in the social network database; and calculating an analysis index for the specific space and the specific time based on the filtered relation information.

20 Claims, 15 Drawing Sheets

(56) References Cited

U.S. PATENT DOCUMENTS

2014/0019540 A1  1/2014  Shin et al.
2015/0264092 A1* 9/2015  Herger ................. H04L 65/403
                                                  709/204

* cited by examiner

METHOD AND SYSTEM FOR DETECTING AND USING LOCATIONS OF ELECTRONIC DEVICES OF USERS IN A SPECIFIC SPACE TO ANALYZE SOCIAL RELATIONSHIPS BETWEEN THE USERS

CROSS-REFERENCE TO RELATED APPLICATION(S)

This application claims priority under 35 U.S.C. § 119 to Korean Patent Application No. 10-2015-0156835 filed Nov. 9, 2015, in the Korean Intellectual Property Office (KIPO), the entire contents of which are incorporated herein by reference.

BACKGROUND

Field

One or more example embodiments relate to a method and system for analyzing social relationships (e.g., a social network) between visitors present in a specific space.

Description of Related Art

With the recent advances in research on social network analysis technology, it is possible to quantitatively analyze a social network of a group that includes individuals. Currently, use of social network services (SNSs) is widespread and a personal mobile terminal may concurrently have location information and social network information.

The social network analysis technology according to the related art generally relates to analyzing exponentially increasing amounts of data based on a relation between users. For example, the social network analysis technology according to the related art may analyze an entire collection of data in association with a specific space, such as a specific location or place, and may extract and/or analyze related data, however, may be unaware of a type of users present in a corresponding space at a specific time and a type of a social network between the users.

SUMMARY

One or more example embodiments provide a social network analyzing method and a social network server that may analyze, based on location information of electronic devices of users, social network information between users present in a desired space in real time by calculating new information through combination of location information and social network information and by analyzing a social network between users present in a specific space for each time based on the specific space, and a non-transitory computer-readable medium coupled with a computer to configure the social network server storing a program to implement the social network analyzing method.

At least one example embodiment provides a non-transitory computer-readable medium coupled with a computer to configure a social network server and storing a computer program to implement a social network analyzing method. The social network analyzing method includes storing and managing social network data in a social network database; receiving location information from a plurality of electronic devices associated with the social network data; specifying users of electronic devices present in a specific space at a specific time among the plurality of electronic devices; filtering relation information between the specified users in the social network database; and calculating an analysis index for the specific time and the specific time based on the filtered relation information.

At least one example embodiment also provides a social network analyzing method of a social network server, the method including storing and managing social network data in a social network database; receiving location information from a plurality of electronic devices associated with the social network database; specifying users of electronic devices present in a specific space at a specific time among the plurality of electronic devices; filtering relation information between the specified users in the social network database; and calculating an analysis index for the specific time and the specific space based on the filtered relation information.

At least one example embodiment provides a social network server including a memory configured to store computer-readable instructions; and at least one processor configured to execute the computer-readable instructions. The at least one processor includes a storage controller configured to control the social network server to store and manage social network data in a social network database; a reception controller configured to control the social network server to receive location information from a plurality of electronic devices associated with the social network database; a user specifier configured to control the social network server to specify users of electronic devices present in a specific space at a specific time among the plurality of electronic devices; a relation information filter configured to filter relation information between the specified users in the social network database; and an analysis index generator configured to calculate an analysis index for the specific time and the specific space based on the filtered relation information.

According to at least one some example embodiments, it is possible to analyze social network information between users present in a desired space in real time by calculating new information through combination of location information and social network information and by analyzing a social network between users present in a specific space for each time based on the specific space.

According to at least some example embodiments, it is possible to filter, provide and/or recommend information, such as a space, a time, a user or a user group, etc., suitable for a variety of conditions based on social network information analyzed for each space and/or each time.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

Figure 1:
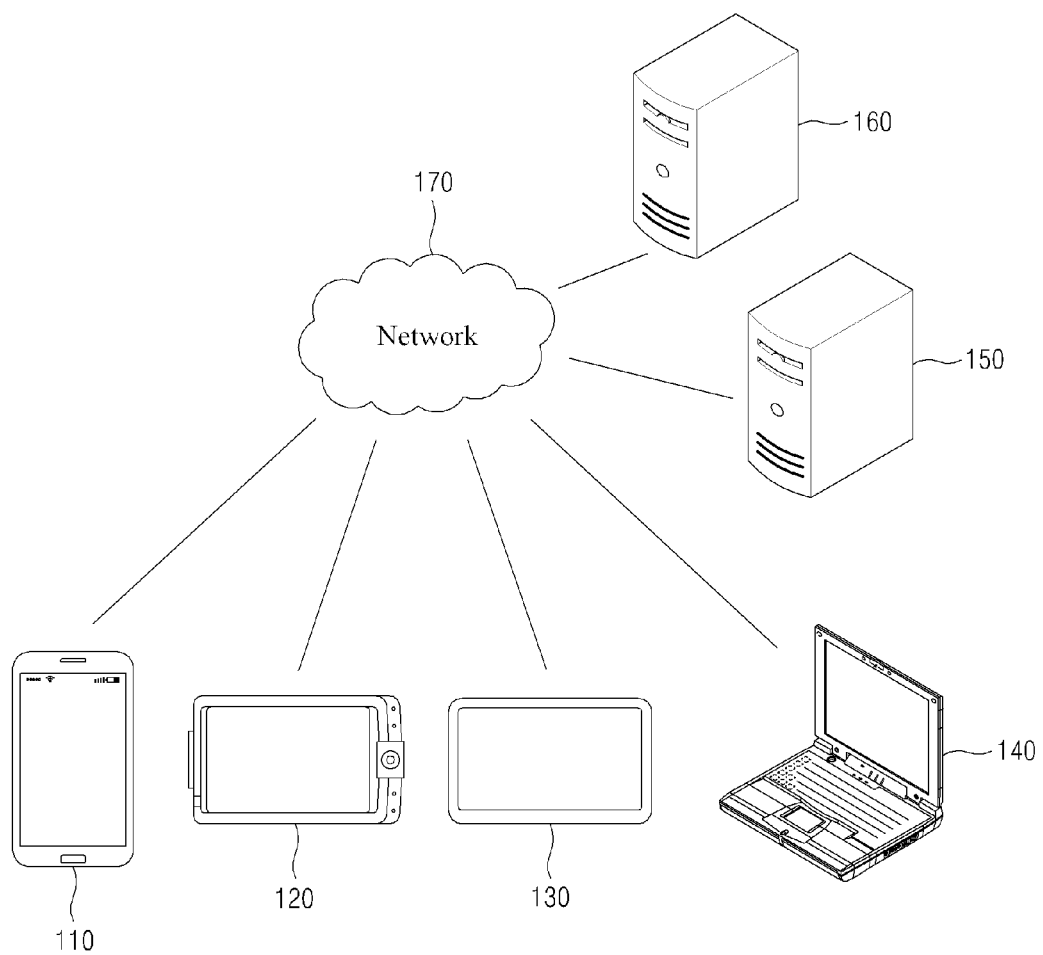
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relation to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Example embodiments relate to technology for recommending a meeting place using appointment information. In detail, the example embodiments relate to a method, system, and non-transitory computer-readable medium that may provide appointment information of a meeting users are to attend to affiliated stores, may receive a recommendation on a meeting place from the affiliated stores, and may provide the received recommendation information to the users.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, the electronic device 110 may communicate with other electronic devices 120, 130, and 140, and/or the servers 150 and/or 160 over the network 170 in a wired communication manner or in a wireless communication manner.

The communication scheme is not particularly limited and may include a communication scheme that uses near field communication between devices as well as a communication method using a communication network, for example, a mobile communication network, the wired Internet, the wireless Internet, and a broadcasting network. For example, the network 170 may include at least one of networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. The electronic device 110 may use a service and/or content provided from the server 150 by connecting to the server 150 under control of at least one program, for example, browser or the installed application, and an operating system (OS) included in the electronic device 110. For example, in response to a service request message transmitted from the electronic device 110 to the server 150 over the network 170 under control of the application, the server 150 may transmit a code corresponding to the service request message to the electronic device 110. The electronic device 110 may provide content to a user by displaying a code-based screen under control of the application. As another example, the server 150 may set a communication session for a messaging service and may route message transmission and reception between the plurality of electronic devices 110, 120, 130, and 140 through the set communication session. Also, the server 150 may provide a social network service (SNS) to the electronic devices 110, 120, 130, and/or 140.

Figure 2:
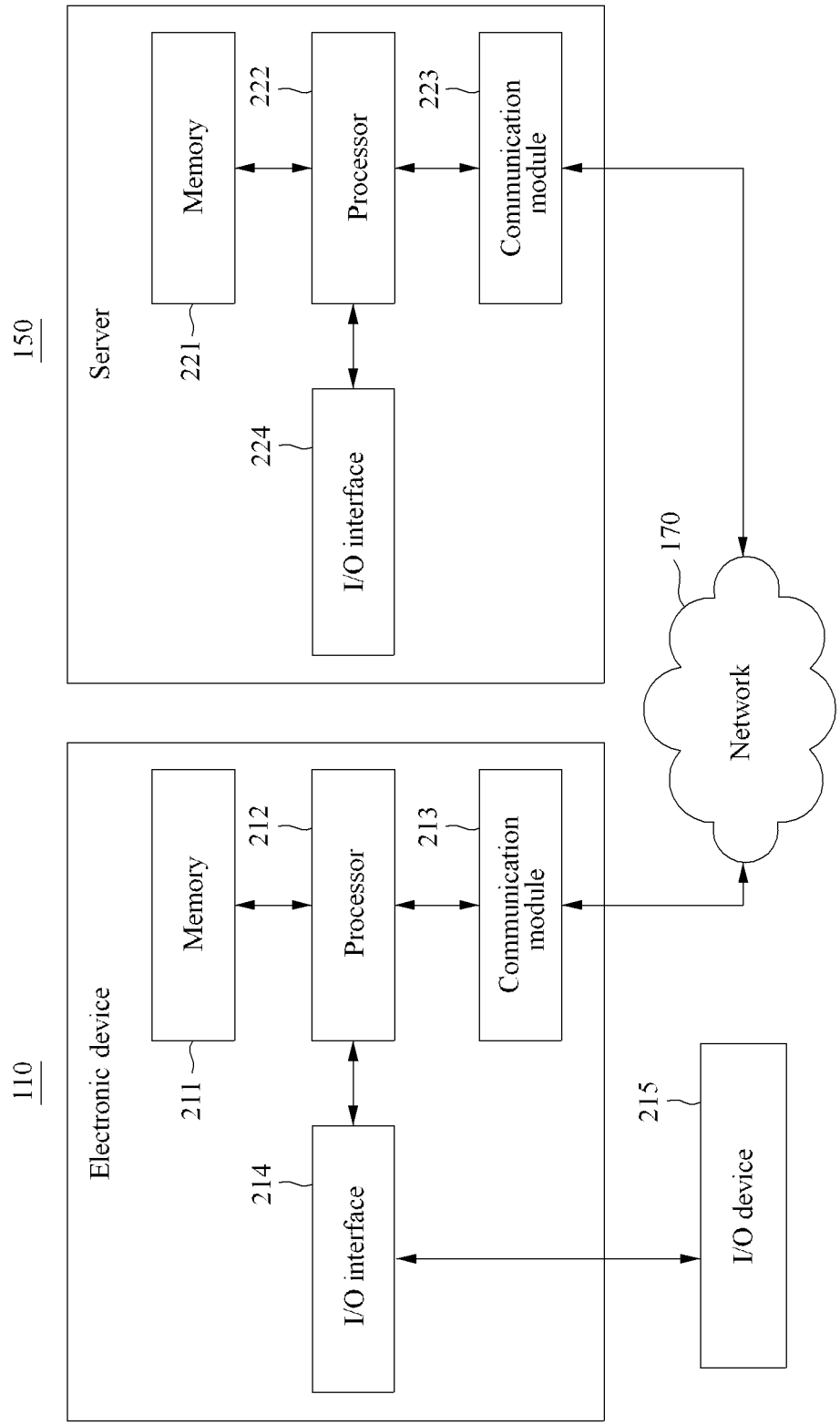
FIG. 2 is a block diagram illustrating a configuration of an electronic device and a server according to at least one example embodiment.

FIG. 2 is a block diagram illustrating a configuration of an electronic device and a server according to at least one example embodiment. Also, FIG. 2 illustrates a configuration of the electronic device 110 as an example for a single electronic device and illustrates a configuration of the server 150 as an example for a single server. The other electronic devices 120, 130, and 140, and/or the server 160 may have the same or similar configuration to the electronic device 110 and/or the server 150.

Referring to FIG. 2, the electronic device 110 may include a memory 211, a processor 212, a communication module 213, and an input/output (I/O) interface 214. Further, the server 150 may include a memory 221, a processor 222, a communication module 223, and an I/O interface 224. The memories 211 and 221 may each include, as a non-transitory computer-readable storage medium, a mass storage device. According to at least some example embodiments, the mass storage device may be, for example, a random access memory (RAM), read only memory (ROM), non-volatile memory (e.g., flash memory), a disk drive, etc. Also, an OS and at least one program code, for example, computer-readable instructions for the browser or the application installed and executed on the electronic device 110, may be stored in the memory 211 and/or the memory 221. Such software constituent elements may be loaded from another computer-readable storage medium separate from the memory 211 and/or 221 using a drive mechanism. The other computer-readable storage medium may include, for example, a floppy drive, a disk, a tape, a DVD/CD-ROM drive, a memory card, etc. According to other example embodiments, software constituent elements may be loaded to the memory 211 and/or 221 through the communication module 213 and/or 223, instead of, or in addition to, the computer-readable storage medium. For example, at least one program may be loaded to the memory 211 and/or 221 based on a program, for example, the application, installed by files provided over the network 170 from developers or a file distribution system, for example, the server 150 of FIG. 1 that provides an installation file of the application.

The processor 212 and/or 222 may be configured to process computer-readable instructions, for example, the aforementioned at least one program code, of a computer program by performing basic arithmetic operations, logic operations, and I/O operations. The computer-readable instructions may be provided, to the processor 212 and/or 222, from the memory 211, the memory 221, the commination module 213, and/or the communication module 223. For example, the processor 212 and/or 222 may be configured to execute received instructions in response to the program code stored in the storage device such as the memory 211 and/or 222.

The communication module 213 and/or 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request generated based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214 and/or 224 may be a device used for interface with an I/O device 215. For example, an input device may include a keyboard, a mouse, etc., and an output device may include a device, such as a display for displaying a communication session of an application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O devices 215, or may further include other constituent elements, for example, a transceiver, a global positioning system (GPS) module, a camera, a variety of sensors, a database, and the like.

Herein, a social network server, for example, the server 150 may analyze a social network between visitors, for example, users of communication terminals, present in a specific space based on location information and social network information of the communication terminals, for example, the plurality of electronic devices 110, 120, 130, and 130. The social network information or social network data may indicate relation data used for a general SNS. A symmetric type and an asymmetric type may be present based on a type of relation data. The symmetric type indicates that a mutual connection is made between two users, and the asymmetric type indicates that a one-side connection is made between the two users. In general, the symmetric type may be used. If the symmetric type is used, asymmetric data may be converted to symmetric data and thereby used.

Figure 3:
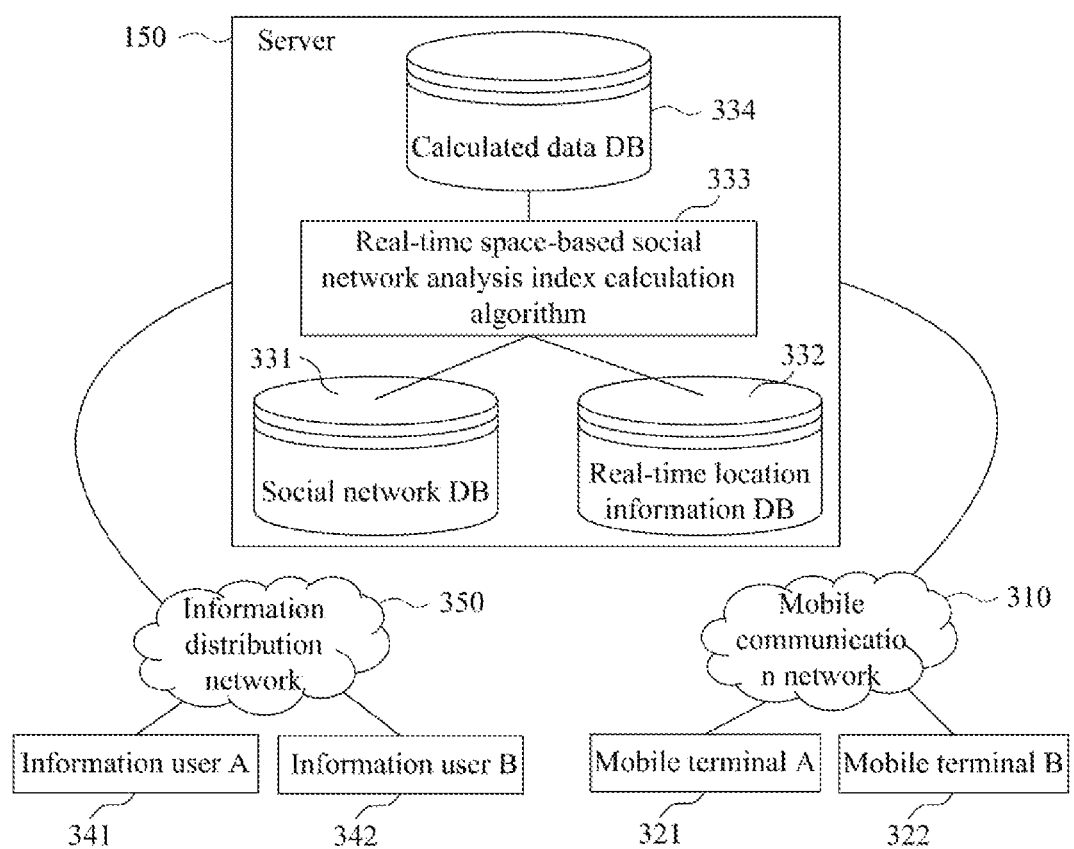
FIG. 3 is a diagram illustrating an example of a data flow according to at least one example embodiment.

FIG. 3 is a diagram illustrating an example of a data flow according to at least one example embodiment. As described above, the server 150 may be a social network server and may be a system that provides a social network service. For example, the server 150 may provide the social network service through communication with mobile terminals, for example, a mobile terminal A 321 and a mobile terminal B 322, over a mobile communication network 310. The mobile communication network 310 may be included in the network 170 of FIG. 1, and the mobile terminals may be, include, or be included in, the electronic devices 110, 120, 130, and 140.

The server 150 may store and manage a variety of information associated with the social network service in a social network database 331. For example, the social network database 331 may include information about users, for example, the mobile terminal A 321 and the mobile terminal B 322 and information about a relation between the users.

Here, the "relation" may indicate a social relationship, such as a friend relation, set between users, a special relevance between users, such as a specific event, for example, an online meeting, a wiring, etc., and the like.

Also, the server 150 may store and manage real-time location information of the mobile terminals, for example, the mobile terminal A 321 and the mobile terminal B 322, in a real-time location information database 332. For example, location information may be periodically received from the mobile terminals, for example, the mobile terminal A 321 and the mobile terminal B 322. In this case, time-based location information may be managed in the real-time location information database 332 for each mobile terminal.

The server 150 may calculate new data by analyzing social network information of the social network database 331 and the real-time location information database 332 based on a real-time space-based social network analysis index calculation algorithm 333. Here, the calculated data may be stored and managed in a calculated data database 334.

Information users, for example, an information user A 341 and an information user B 342, may be entities that use the calculated new data by connecting to the server 150 through an information distribution network 350, and may indicate communication terminals that are substantially included in the electronic device 110, 120, 130, and 140. The information distribution network 350 may be included in the network 170.

The server 150 may receive a preset (or, alternatively, desired) condition from information users connected through the information distribution network 350, and may provide information corresponding to the condition using the calculated data database 334. For example, the server 150 may deduce a set of visitors that are present in or have passed by a specific space at a specific time based on real-time location information, may filter social network information between the visitors. For example, the server 150 may draw a result by analyzing the filtered social network information, for example, the calculated new data which may be suitable for the purposes of the information users, and may appropriately use the drawn result.

Figure 4:
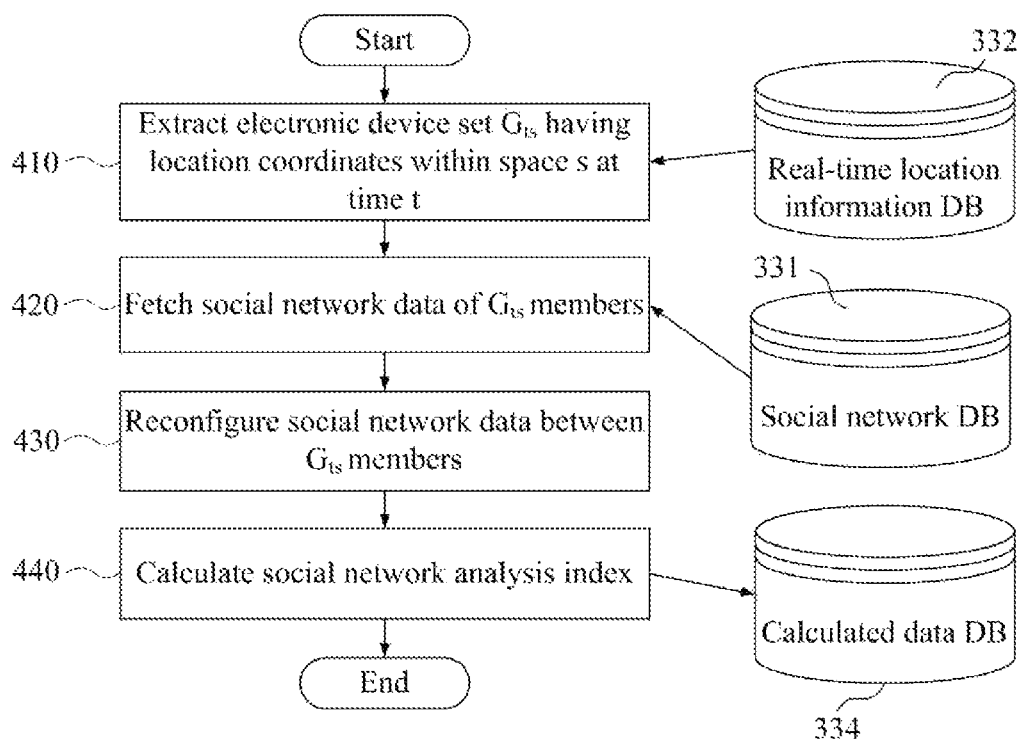
FIG. 4 illustrates an example of a data processing process according to at least one example embodiment.

FIG. 4 illustrates an example of a data processing process according to at least one example embodiment.

In operation 410, the server 150 may extract an electronic device set $G_{ts}$ having location coordinates within a space s at a time t from the real-time location information database 332.

In operation 420, the server 150 may fetch social network data of $G_{ts}$ members from the social network database 331.

In operation 430, the server 150 may reconfigure the social network data between $G_{ts}$ members.

In operation 440, the server 150 may calculate a social network analysis index.

For example, the server 150 may verify electronic devices present in the space s at the time t based on real-time location information, and may specify users, for example, individuals or visitors, based on social network data of the social network database 331 or the real-time location information database 332. Here, the server 150 may obtain relation information between the users present in the space s at the time t by filtering and extracting relation information between the specified visitors from the entire relation information. Various analysis indices may be generated based on the relation information. The analysis indices generated as the new data may be used as data that indicates a community level associated with the time s and the time t.

Figure 5:
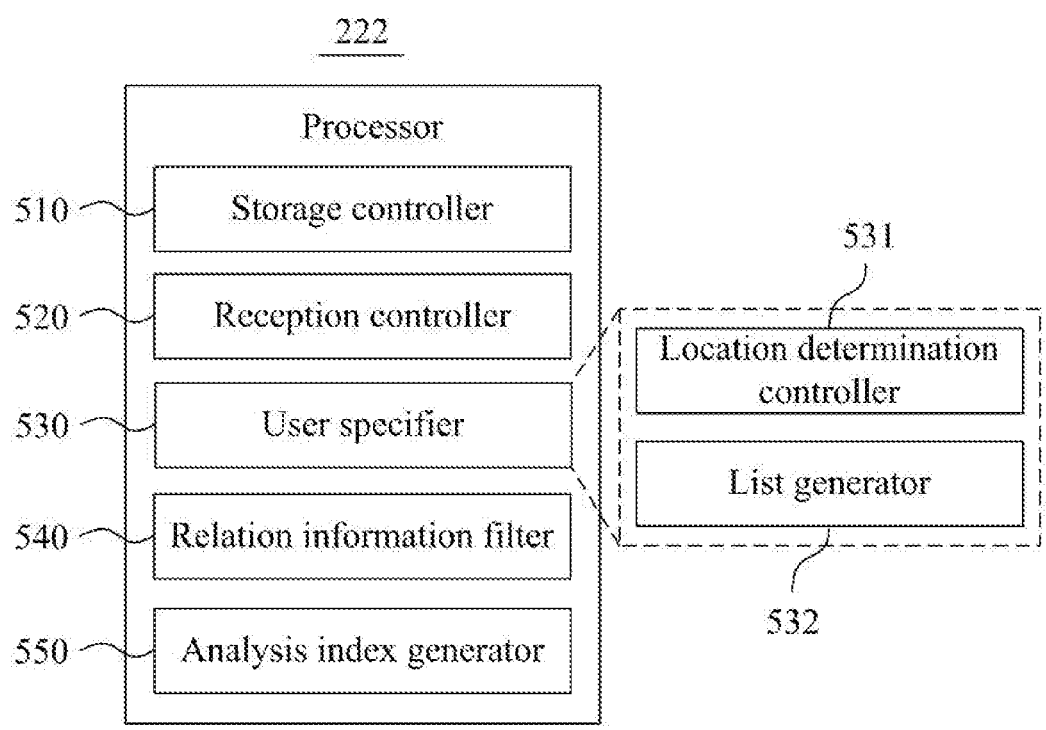
FIG. 5 is a block diagram illustrating an example of constituent elements includable in a processor of a server according to at least one example embodiment.
Figure 6:
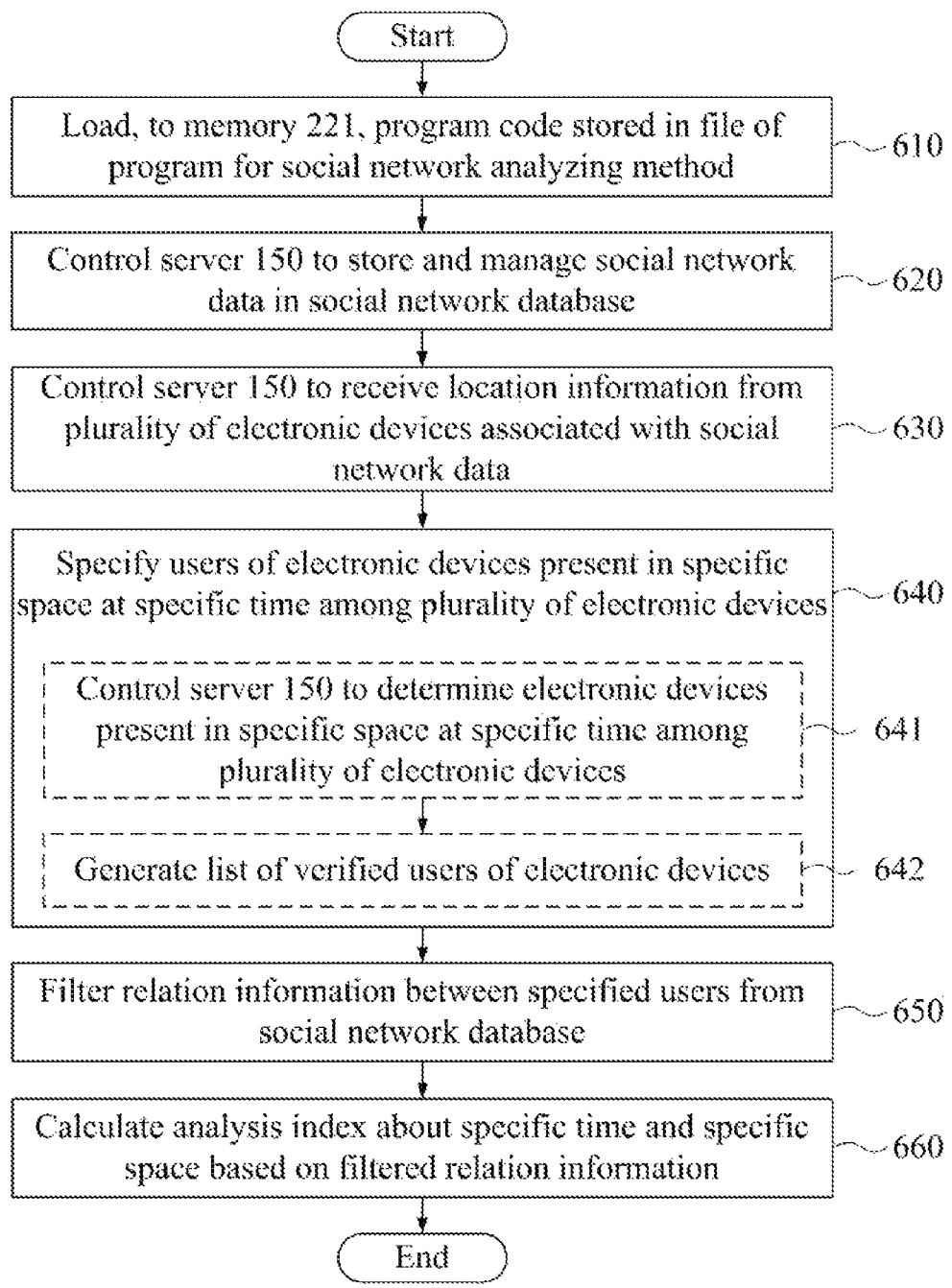
FIG. 6 is a flowchart illustrating an example of a social network analyzing method performed at a server according to at least one example embodiment.

FIG. 5 is a block diagram illustrating an example of constituent elements includable in a processor of a server according to at least one example embodiment, and FIG. 6 is a flowchart illustrating an example of a social network analyzing method performed at a server according to at least one example embodiment.

Referring to FIG. 5, the processor 222 of the server 150 may include a storage controller 510, a reception controller 520, a user specifier 530, a relation information filter 540, and an analysis index generator 550 as constituent elements. The processor 222 and the constituent elements of the processor 222 may control the server 150 to perform operations 610 through 660 included in the social network analyzing method of FIG. 6. Here, the processor 222 and/or the constituent elements of the processor 222 may be configured to execute instructions according to a code of at least one program and a code of an OS included in the memory 221. Here, the constituent elements of the processor 222 may represent different functions performed by the processor 222, for example, through execution of program code including instructions corresponding to the different functions. For example, the storage controller 510 may represent the function of controlling the server 150 such that the processor 222 may store and manage social network data in a social network database in response to the instructions.

In operation 610, the processor 222 may load, to the memory 221, a program code stored in a file of a program for the social network analyzing method. For example, in response to executing the program installed on the server 150, the processor 222 may control the server 150 to load the program code from the file of the program to the memory 221.

Here, the processor 222 and the storage controller 510, the reception controller 520, the user specifier 530, the relation information filter 540, and the analysis index generator 550 included in the processor 222 may perform operations 620 through 660 by executing a portion, for example, an instruction, corresponding to the program code loaded to the memory 221. The processor 222 and/or the constituent elements of the processor 222 may control the server 150 to perform operations 620 through 660. For example, the processor 222 may control the communication module 223 included in the server 150 so that that the server 150 may communicate with an electronic device, for example, the electronic device 110 or another server, for example, the server 160.

In operation 620, the storage controller 510 may control the server 150 to store and manage social network data in the social network database. For example, the social network database may correspond to the social network database 331 of FIG. 3.

In operation 630, the reception controller 520 may control the server 150 to receive location information from a plurality of electronic devices associated with the social network data. The received location information may be stored and managed in the real-time location database 332 of FIG. 3.

In operation 640, the user specifier 530 may specify users of electronic devices present in a specific space at a specific time among the plurality of electronic devices. For example, the user specifier 530 may verify electronic devices present in the specific space, for example, a place A, at the specific time, for example, at a present time, based on location information of electronic devices stored in the real-time location information database 332, and may specify users of the verified electronic devices by verifying the users based on the real-time location information database 332 or the social network database 331.

To this end, the user specifier 530 may include a location determination controller 531 and a list generator 532 as shown in FIG. 5, and operations 641 and 642 may be included in operation 640.

In operation 641, the location determination controller 530 may control the server 150 to determine the electronic devices present in the specific space at the specific time among the plurality of electronic devices. As described above, the location determination controller 530 may verify electronic devices present in the specific space, for example, the place A, at the specific time, for example, at the present time, based on location information of the electronic devices stored in the real-time location information database 332.

Here, the specific time may be a subdivided time, such as x hour x minute x second, or may be a time section from 13 hours to 14 hours. Also, the specific space may be an area divided based on an administrative district or an area arbitrarily divided on a map, for example, an area segmented into lattices with a preset width. Alternatively, the specific space may be a range with a predetermined (or, alternatively, desired) radius from a reference point. Also, the specific space may be an indoor space of a specific building, a portion of the indoor space, or a specific floor of the specific building.

In operation 642, the list generator 540 may generate a list of verified users of electronic devices. For example, the real-time location information database 332 may time-sequentially manage location information about each of the plurality of electronic devices, and may include information about users of the plurality of electronic devices. Here, the list generator 540 may specific users of the specific time and/or the specific space by generating a list of users of electronic devices, for example, electronic devices present in the specific place at the specific time based on user information for each electronic device stored in the real-time location information 332 or the social network database 331.

In operation 650, the relation information filter 540 may filter relation information between the specified users from the social network database. For example, the relation information filter 540 may filter the relation information between the specified users in the list generated in operation 640. In detail, if the generated list includes users A, B, C, D, and E, the relation information filter 540 may filter the relation information by extracting relation information between the users A, B, C, D, and E from the social network database that manages social network data of the entire users.

In operation 660, the analysis index generator 550 may calculate an analysis index about the specific time and the specific space based on the filtered relation information. The analysis index may be information that indicates relation information between users preset in the space s at the time t. For example, in operation 660, the analysis index generator 550 may quantitatively calculate an analysis index about a social network between the specified users based on the number of relations between the specified users in the filtered relation information. In detail, the analysis index may be quantified as a numerical value within a preset (or, alternatively, desired) range, for example, a rational number between 0 and 1.

Here, the server 150 may construct an analysis index database configured to store and manage the calculated analysis index. To this end, after operation 660, the method of FIG. 6 may further include constructing an analysis index database by storing an analysis index calculated at desired time intervals in association with a corresponding space and time interval, with respect to each of a plurality of spaces. For example, the storage controller 510 may control the server 150 to perform this operation.

The calculated analysis index may include various types of indices, such as an index for analyzing the entire social network between the specified users, an index indicating the number of relations for each visitor, an index for detecting a group from the social network between the specified users, and the like. Hereinafter, a method of calculating each analysis index and a method of analyzing a social network based on the calculated analysis index will be further described.

Initially, an index for analyzing the entire social network between specified users will be described.

A social network between users present within a specific space, for example, a space s, at a specific time, a time t, may be represented as a single value, for example, an analysis index. The analysis index may be a rational number between 0 and 1.

For example, in operation 660, the analysis index generator 550 may determine users having set a mutual relation among the specified users based on the filtered relation information, and may calculate a relative ratio between the number of the determined users and the number of the specified users as the analysis index. The specified users may be visitors present within the space s at the time t, and the number of specified users may be represented as N. Here, N denotes a natural number. Also, the determined users may be visitors that are connected to, for example, that have set a relation with at least one of the specified users, and the number of determined users may be represented as M. Here, M denotes a natural number. An index that represents the social network between the specified users may be calculated as M/N.

In another example, in operation 660, the analysis index generator 550 may calculate a desired number of cases in which a relation is settable between the specified users, may determine the number of cases in which the relation is substantially set between the specified users based on the filtered relation information, and may calculate a ratio between the number of settings and the desired number of cases as the analysis index. According to at least some example embodiments, the analysis index generator 550 may calculate the maximum number of cases in which a relation is settable between the specified users as the desired number of cases. For example, the maximum number of cases in which the relation is settable between the specified users may be calculated as $H=(N*(N-1)/2)$. If the number of settings is K, the index that represents the social network between the specified users may be calculated as K/H.

For the purpose of a service, the following analysis may be performed based on the analysis index.

A first analysis method may be performed to draw an absolute conclusion about a single time or a single space. For the first analysis method, the method of FIG. 6 may further include generating analysis information about a first space or a first time to be analyzed after operation 660. In this case, an analysis information generator (not shown) further includable in the processor 222 of FIG. 5 may perform this operation.

Figure 7:
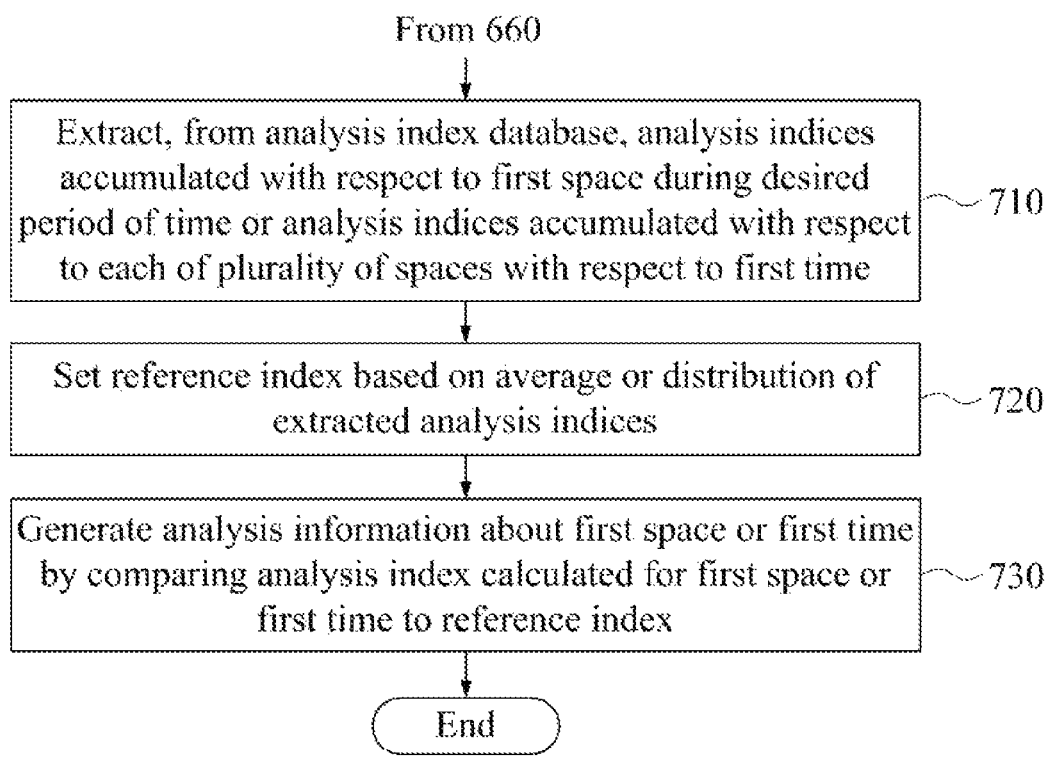
FIG. 7 is a flowchart illustrating an example of a process of generating analysis information according to at least one example embodiment.

FIG. 7 is a flowchart illustrating an example of a process of generating analysis information according to at least one example embodiment.

In operation 710, the analysis information generator may extract, from the analysis index database, analysis indices accumulated with respect to the first space during a desired period of time or analysis indices accumulated with respect to each of the plurality of spaces with respect to the first time.

In operation 720, the analysis information generator may set a reference index based on the average or distribution of the extracted analysis indices. For example, the analysis information generator may extract analysis indices accumulated during the desired period of time, for example, a day with respect to the space s, may calculate the average of the extracted analysis indices, and may generate the calculated average as a reference index for the space s. Also, the analysis information generator may extract analysis indices of a plurality of different spaces with respect to the time t, may calculate the average of the extracted analysis indices, and may generate the calculated average as a reference index for the time t.

In operation 730, the analysis information generator may generate analysis information about the first space or the first time by comparing an analysis index calculated for the first space or the first time to the reference index. For example, the analysis information generator may compare the reference index and an analysis index with respect to a social network between current visitors in association with the space s. Here, the analysis index being greater than the reference index may indicate that the current visitors may be users having a social relation greater than the average. Inversely, if the analysis index is less than the reference index, it may indicate that the current visitors may be users having a social relation less than the average. As another example, if the reference index for the current time t is generated, a space in which users having a social relation greater than or less than the average may be retrieved from among the plurality of spaces.

A reference index for a space may be calculated based on the average or distribution of values calculated by accumulating data during a desired period of time with respect to the same space. Also, a reference index for a time may be calculated based on the average or distribution of values calculated by accumulating data of a plurality of spaces with respect to the same time. If necessary, an arbitrarily input value may be used for the reference index.

A second analysis method may be performed to draw a relative conclusion by comparing a plurality of times or a plurality of spaces. For the second analysis method, the method of FIG. 6 may further include generating analysis information about at least one space or at least one time to be analyzed. This operation may be performed by the analysis information generator.

Figure 8:
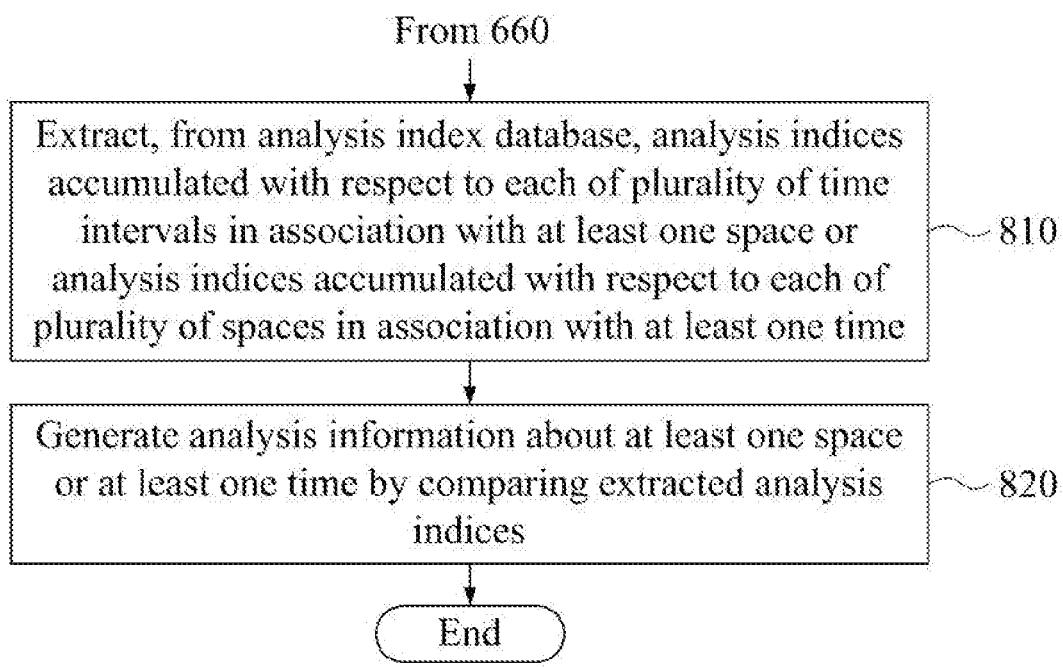
FIG. 8 is a flowchart illustrating another example of a process of generating analysis information according to at least one example embodiment.

FIG. 8 is a flowchart illustrating another example of a process of generating analysis information according to at least one example embodiment.

In operation 810, the analysis information generator may extract, from the analysis index database, analysis indices accumulated with respect to each of a plurality of time intervals in association with at least one space or analysis indices accumulated with respect to each of the plurality of spaces in association with at least one time.

In operation 820, the analysis information generator may generate analysis information about the at least one space or the at least one time by comparing the extracted analysis indices.

For example, the analysis information generator may calculate values, for example, analysis indices, of a plurality of times with respect to a single space and may deduce a time corresponding to a lowest or highest value. The analysis information generator may calculate values, for example, analysis indices, of a plurality of spaces with respect to a single time and may deduce a space corresponding to a lowest or highest value. Also, the analysis information generator may calculate values, for example, analysis indices for each of the plurality of times and the plurality of spaces and may deduce a space corresponding to a lowest value or a highest value.

If values of the plurality of times are calculated with respect to a single space s, a time corresponding to a highest value may indicate that users having a relatively high social relation at the time are preset in the space s.

Hereinafter, an index that represents the number of relations for each visitor will be described.

A value indicating the number of other visitors with whom each of users, for example, visitors, has set a relation with respect to each of the users present in the space s at the time t may be generated as an analysis index.

For example, the analysis information generator may extract the number of relations set with the specified users from the filtered relation information with respect to each of the specified users, and may generate the analysis index based on the extracted number of relations.

For example, the number of relations may be generated as the analysis index as is. In this case, the analysis index may have a positive integer range between 0 and N−1. If an analysis index for a user a is 0, it may indicate that the user a has not set any relation with the specified users. If the analysis index for the user a is N−1, it may indicate that the user a has set a relation with all of the specified users.

In another example, a value quantified as a numerical value of a preset range based on the number of relations may be generated as the analysis index. For example, a ratio between the number of relations and a total number of cases in which a relation with the specified users is settable may be used as the analysis index. In this case, the analysis index may have a rational number range between 0 and 1.

Figure 9:
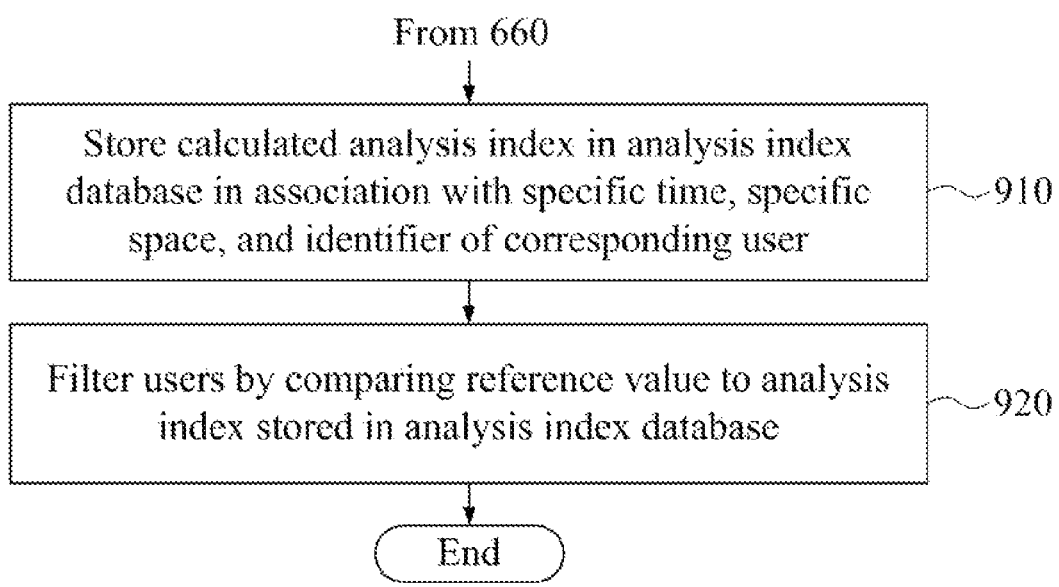
FIG. 9 is a flowchart illustrating an example of a process of generating an analysis index based on the number of relations for each visitor according to at least one example embodiment.

FIG. 9 is a flowchart illustrating an example of a process of generating an analysis index based on the number of social networks for each visitor according to at least one example embodiment. Operations 910 and 920 may be performed after operation 660 depending on example embodiments.

In operation 910, the analysis information generator may store the calculated analysis index in the analysis index database in association with the specific time, the specific space, and an identifier of a corresponding user. The following Table 1 shows an example of information that may be stored in the analysis index database.

TABLE 1

| Space | Time 1 | | | Time 2 | |
| --- | --- | --- | --- | --- | --- |
| | User a | User b | User c | User a | User d |
| A | 2 | 1 | 1 | 0 | 0 |

Table 1 represents that users a, b, and c are present in the space A of the time 1, and indicates that two persons have set a relation with the user a in the space A, one person has set a relation with the user b in the space A, and one person has set a relation with the user c in the space A. Also, Table 1 represents that users a and d are present in the space A of the time 2, and indicates that no person has set a relation with the users a and d in the space A. That is, a person having the number of relations as "0" is highly like to be a person having visited the space A alone, a person having the number of relations as "1" is highly likely to be a person having visited the space A with his/her acquaintance, and a person having the number of relations as "2" is highly likely to be a person having sited the space A together with his/her two or more acquaintances.

In operation 920, the analysis information generator may filter users by comparing a reference value to the analysis index stored in the analysis index database. For example, if the reference value is 2, the user a may be detected from Table 1 through filtering. In the case of extracting user(s) having set a relation with ten or more users in the same space, the analysis information generator may set the reference value as 10 and may extract user(s) having an analysis index of 10 or more from the analysis index database. As described above, the analysis information generator may filter user(s) having the number of relations greater than or equal (or greater than) the reference value or less than or equal to (or less than) the reference value. Also, the analysis information generator may filter user(s) having the number of relations equal to the reference value or user(s) having the largest (or smallest) number of relations.

Hereinafter, an index for detecting a group from a social network between the specified users will be described.

An index for detecting a group from a social network between users, for example, visitors, present in the space s at the time t may be generated as an analysis index. Here, if a relation is set between all of the users included in a single set, the users of the set may configure a single group. For example, if a subset is configured among visitors present within the space s at the time t and all of the users of the subset have set a mutual relation, the subset may be regarded as a single group. Groups may be set not to cross each other or not to have an inclusion relation. For example, if a large group includes a small group, only the large group may be regarded as a group.

Figure 10:
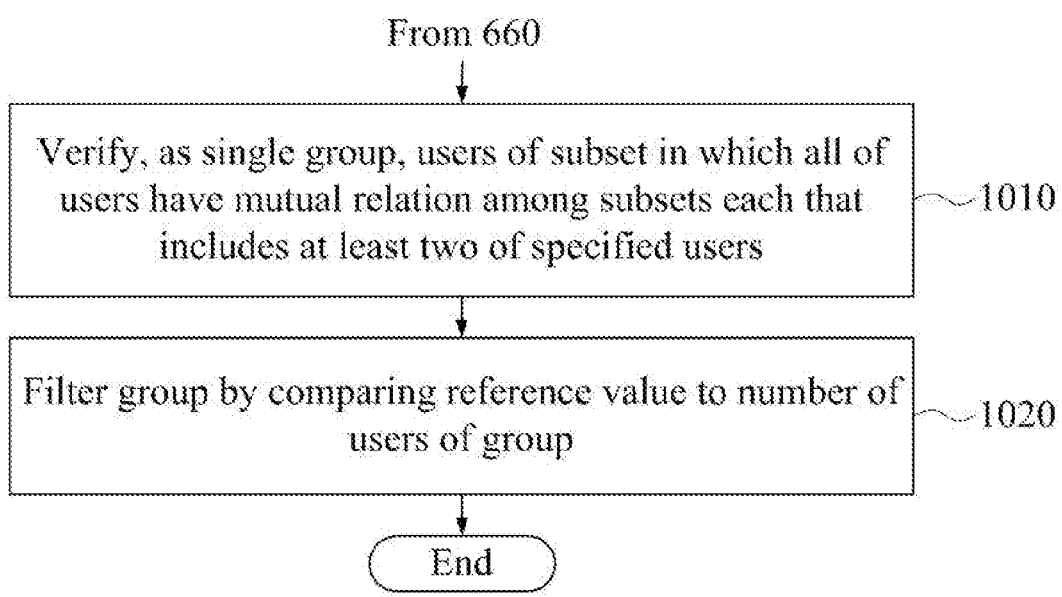
FIG. 10 is a flowchart illustrating an example of a process of generating an analysis index for a group according to at least one example embodiment.

FIG. 10 is a flowchart illustrating an example of a process of generating an analysis index for a group according to at least one example embodiment. Operations 1010 and 1020 of FIG. 10 may be performed after operation 660 depending on example embodiments.

In operation 1010, the analysis information generator may verify, as a single group, users of a subset in which all of the users have a mutual relation among subsets each that includes at least two of the specified users. Here, as described above, the respective groups may be set not to cross each other or not to have an inclusion relation. If a large group includes a small group, only the large group may be regarded as a group.

In operation 1020, the analysis information generator may filter the group by comparing a reference value to the number of users of the group. For example, the analysis information generator may receive the number of users included in a group as a reference value. If the input reference value is 5, the analysis information generator may extract a group that includes five or more users, a group that includes five or less users, or a group that includes five users through filtering. In this case, a variety of analysis about a space and a time, such as a space and a time in which a relatively large number of groups including five or more users are present, may be performed based on the extracted information.

Figure 11:
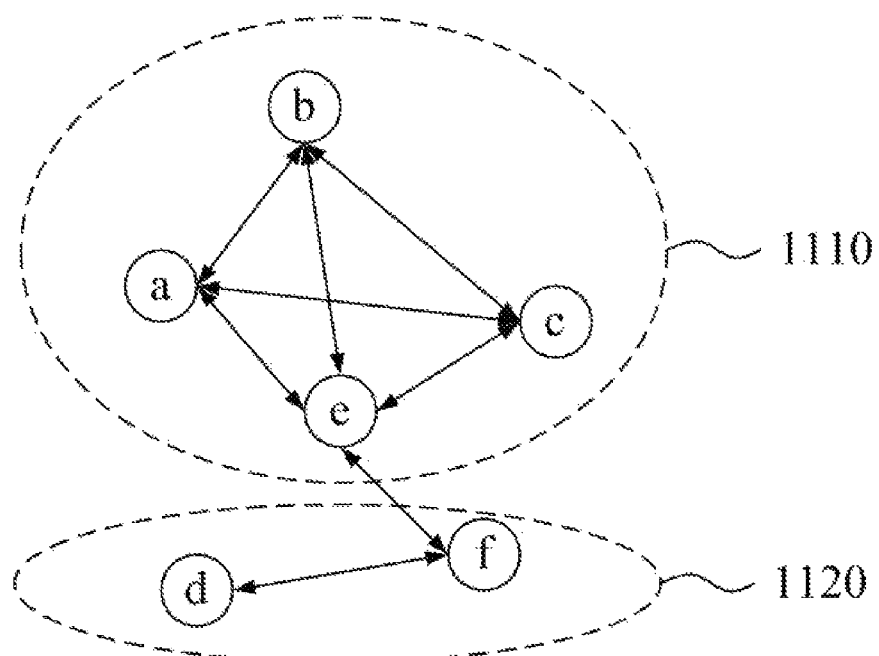
FIG. 11 illustrates an example of a connection between a plurality of nodes according to at least one example embodiment.

FIG. 11 illustrates an example of a connection between a plurality of nodes according to at least one example embodiment. FIG. 11 illustrates a set of nodes, {a, b, c, d, e, f} indicated with circles and a connection between the nodes is indicated with indicators with arrowheads connected between the circles. Sets each including two or more nodes among subsets of given sets may be given as below. Here, sequence between nodes in a subset may be ignored.

{a, b}, {a, c}, {a, d}, {a, e}, {a, f}, {b, c}, {b, d}, {b, e}, {b, f}, {c, d}, {c, e}, {c, f}, {d, e}, {d, f}, {e, f}, {a, b, c}, {a, b, d}, {a, b, e}, {a, b, f}, {a, c, d}, {a, c, e}, {a, c, f}, {a, d, e}, {a, d, f}, {a, e, f}, {b, c, d}, {b, c, e}, {b, c, f}, {b, d, e}, {b, d, f}, {b, e, f}, {c, d, e}, {c, d, f}, {d, e, f}, {a, b, c, d}, {a, b, c, e}, {a, b, c, f}, {a, c, d, e}, {a, c, d, f}, {a, c, e, f}, {b, c, d, e}, {b, c, d, f}, {b, d, e, f}, {c, d, e, f}, {a, b, c, d, e}, {a, b, c, d, f}, {a, b, c, e, f}, {a, b, d, e, f}, {a, c, d, e, f}, {b, c, d, e, f}, {a, b, c, d, e, f}

Excluding subsets in which no connection is present between all of the nodes from the subsets, the following subsets may remain:

{a, b}, {a, c}, {a, e}, {b, c}, {b, e}, {c, e}, {d, f}, {e, f}, {a, b, c}, {a, b, e}, {a, c, e}, {b, c, e}, {a, b, c, e}

Also, excluding a subset of another subset or a subset that crosses another set, the following subsets may remain:

{d, f}, {a, b, c, e}

Accordingly, a first group that includes nodes a, b, c, and d as shown in a first oval 1110 and a second group that includes nodes d and f as shown in a second oval 1120 may be deduced.

Examples of generating, as an analysis index, various types of indices, such as an index for analyzing the entire social network between specified users, an index that represents the number of relations for each visitor, an index for detecting a group from a social network between specified users are described.

Here, the calculated analysis indices may be stored in the analysis index database, for example, the calculated data database 334 in association with a corresponding time, space, and an identifier of a user. The analysis index database may time-sequentially manage the generated analysis indices with respect to each of the plurality of spaces.

In this case, the server 150 may provide a variety of analysis information using the analysis index database.

Figure 12:
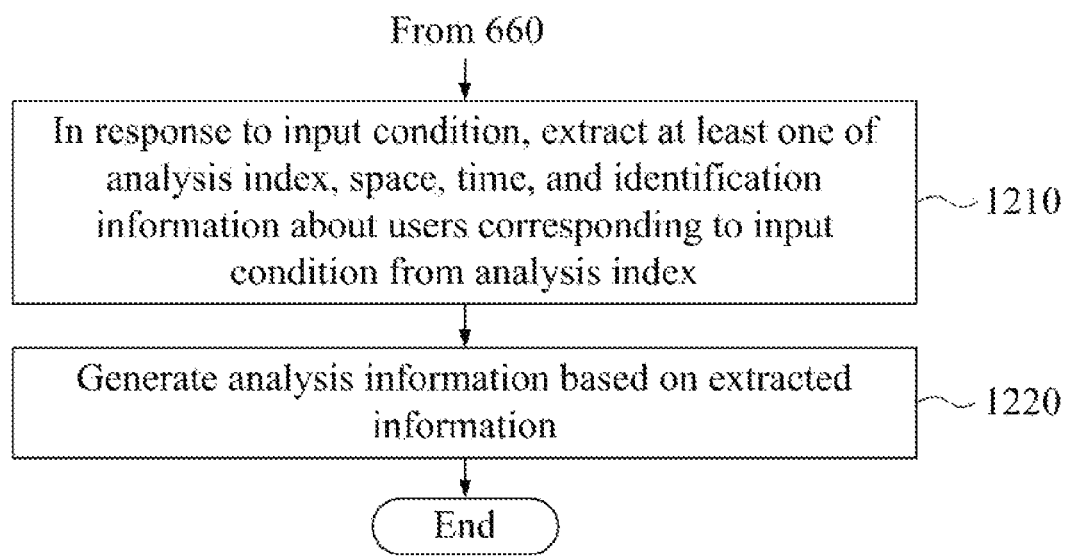
FIG. 12 is a flowchart illustrating a process of providing analysis information using an analysis index database according to at least one example embodiment.

FIG. 12 is a flowchart illustrating a process of providing analysis information using an analysis index database according to at least one example embodiment. Operations 1210 and 1220 of FIG. 12 may be performed after operation 660.

In operation 1210, in response to an input condition, the analysis information generator may extract at least one of an analysis index, a space, a time, and identification information about users corresponding to the input condition from the analysis index database. For example, a variety of information may be extracted based on the condition, such as a space corresponding to the largest number of users having three relations, a time corresponding to the largest number of users having three relations in the specific space, a space or a time corresponding to the largest number of groups each that includes 10 or more members, and the like.

In operation 1220, the analysis information generator may generate analysis information based on the extracted information. For example, if information about a space corresponding to the largest number of users having no relation is extracted, the analysis information generator may classify the space as a space in which relatively many users roam alone.

Hereinafter, example embodiments of using analysis information will be further described. As described above with reference to FIG. 3, information users may propose a variety of conditions by connecting to the server 150. The server 150 may extract information suitable for a condition from an analysis index database, such as the calculated data database 334, may generate analysis information based on the extracted information, and may provide the generated analysis information to the information users. Here, the information users may utilize a service from the server 150 using software, such as a separate application, or may input a condition by connecting to a webpage provided from the server 150 and may utilize a service, such as information corresponding to the condition.

For example, it is possible to recommend a shop opening location to an independent businessman or a franchise company, or to provide a service for evaluating a specific shop opening location.

Figure 13:
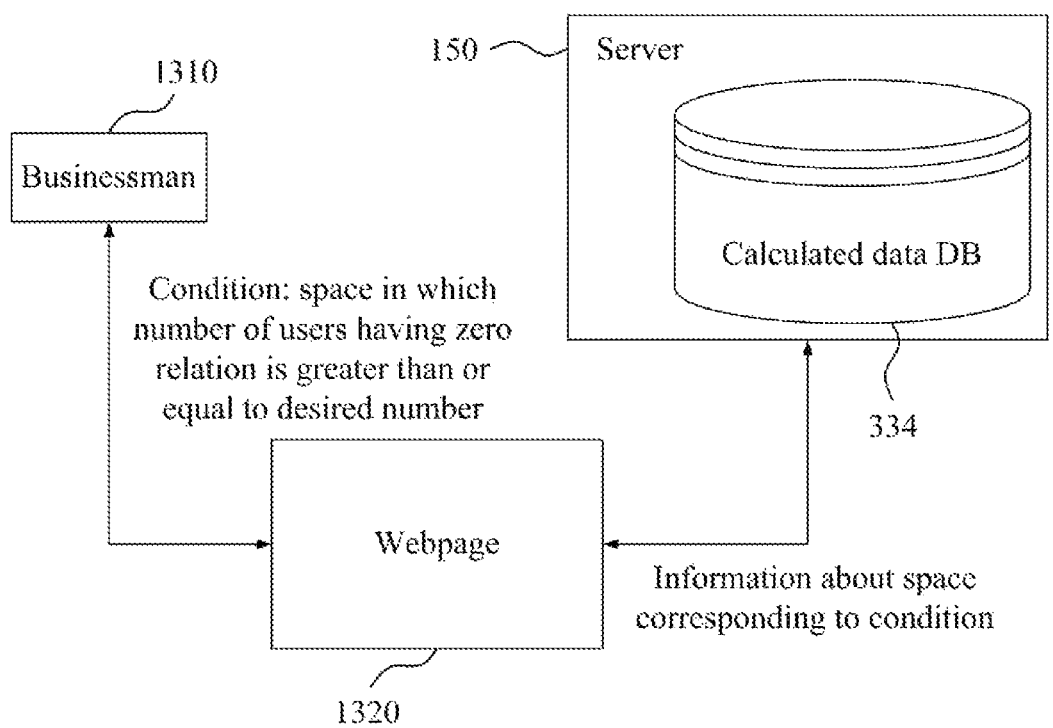
FIG. 13 is a diagram illustrating an example of recommending a space according to at least one example embodiment.

FIG. 13 is a diagram illustrating an example of recommending a space according to at least one example embodiment.

Referring to FIG. 13, a businessman 1310 that is to provide a food service for single persons may prefer a space in which a large number of persons go around alone. Here, the businessman 1310 may connect to the server 150 and may request the server 150 for information about spaces in which a preset (or, alternatively, desired) number of users, for example, 10 users, having the number of relations as "0" are present. For example, the businessman 1310 may connect to a webpage 1320 provided from the server 150 and may select or input the number of relations as "0" through a user interface provided from the webpage 1320. Also, the businessman 1310 may additionally select or input other conditions, for example, the desired number of users and other conditions, for example, the desired number of or more users. In this case, the server 150 may extract, from the calculated data database 334, information about a time and a space corresponding to the number of users having the number of relations as "0, the number of users selected or input from the webpage 1320, and may provide the extracted information to the businessman 1310 through the webpage 1320. Optionally, the server 150 may induce the businessman 1310 to offer an additional condition, such as a specific district (e.g., an administrative district such as ~dong or a specific area on a map), a specific time zone, and the like. If the specific district is provided as a condition, the server 150 may extract, from the calculated data database 334, information about spaces corresponding to the provided additional condition among spaces each in which the desired number of users have zero relations and, and may provide the extracted information.

In another example, the businessman 1310 may request the server 150 to retrieve a space most suitable for a desired condition from among the plurality of spaces. The plurality of spaces may be spaces provided as an analysis result based on the condition in FIG. 13, and may be spaces separately input or selected from the businessman 1310. Here, regarding the plurality of spaces, the server 150 may receive various types of requests through the webpage 1320, such as a request for a space in which the number of visitors having two or more relations is largest, a space in which the number of groups each that includes three or more members is largest, etc. As described above, the requests may be made by providing the businessman 1310 with a user interface for receiving or selecting a value of a specific parameter, for example, the number of relations, the number of group members, a total number of visitors, etc., through the webpage 1320. Here, the server 150 may extract, from the analysis index database, information about the space in which the number of visitors having two or more relations is largest or the space in which the largest number of groups each that includes three or more members is largest.

Table 2 shows an example of data stored in the analysis index database.

TABLE 2

| Space | View 1 | | | View 2 | |
|---|---|---|---|---|---|
| | User a | User b | User c | User a | User d |
| A | 2 | 1 | 1 | 0 | 0 |
| | View 1 | | | View 2 | |
| Space | User e | User f | | User g | User h |
| B | 1 | | 1 | 1 | 1 |
| | View 1 | | | View 2 | |
| Space | User i | User j | User k | User l | User m |
| C | 2 | 2 | 2 | 1 | 1 |

Referring to Table 2, visitors, for example, users a, i, j, and k have two or more relations and, in space C, the number of visitors having the number of relations as 2 or more is largest. Also, in space B, the number of visitors having the number of relation as "1" is largest.

As described above, the server 150 may provide information suitable for a variety of conditions by referring to the constructed analysis index database.

The analysis index database may also be utilized for targeting or promoting information provided online or offline.

Figure 14:
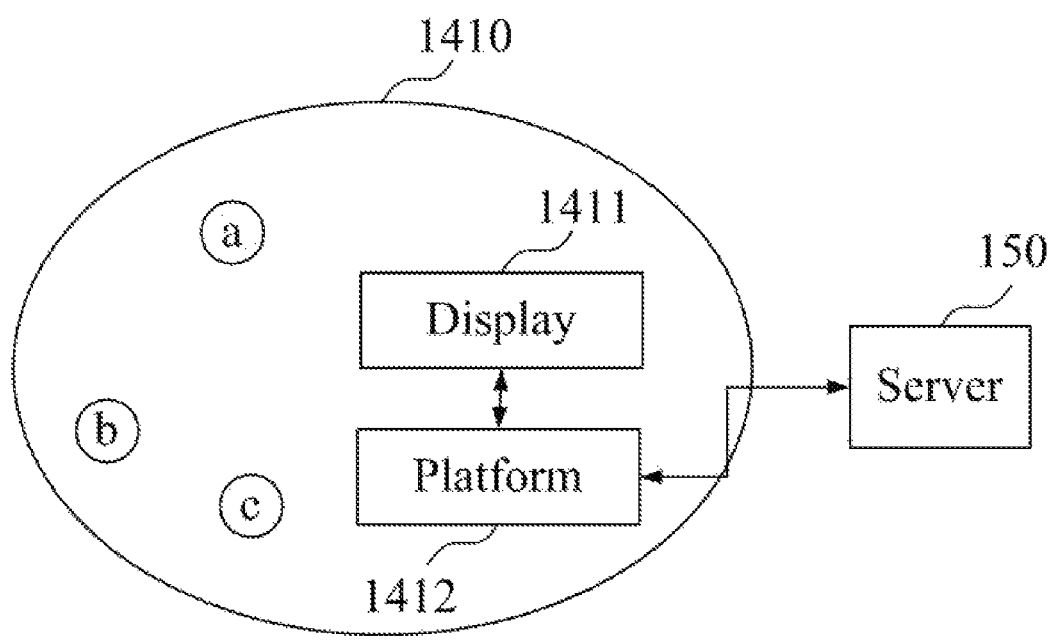
FIG. 14 illustrates an example of processing targeting of information exposed offline according to at least one example embodiment.

FIG. 14 illustrates an example of processing targeting of information exposed offline according to at least one example embodiment. FIG. 14 illustrates a platform 1412 for displaying information to a plurality of unspecific users through a display 1411 installed in a specific space 1410, such as a street or a public place. Here, the server 150 may verify users present in the space 1410 in real time, may generate analysis indices by analyzing social network information between the users present in the space 1410, and may time-sequentially manage the generated analysis indices. The platform 1412 may request the server 150 for information about the users present in the space 1410 at a current time. In response to the request, the server 150 may analyze analysis indices and may provide an analysis result to the platform 1412. For example, when many users present in the space 1410 have zero relations, the server 150 may be aware that many of the users present in the space 1410 are visitors that go around alone. This information may be transmitted to the platform 1412. The platform 1412 may select information focused on single visitors from among a plurality of sets of preset information and may display the selected information on a display 1411. As another example, if many of the users present in the space 1410 have three or more relations, the server 150 may determine that the users present in the space 1410 are generally visitors that four or more acquaintances gather together and go around. In this case, the platform 1412 may select information for visitors that go around together with a plurality of acquaintances and may display the selected information on the display 1411.

Visitors associated with the space 1410 may vary in real time. The server 150 may verify information about the users present in the space 1410 in real time and may provide the verified information to the platform 1412. The platform 1412 may display a type of information on the display 1411 with changing the type of information based on information about the users received from the server 150.

Alternatively, the server 150 may average information about the visitors associated with the space 1410 for each time zone and thereby provide the averaged information. For example, if many visitors go around alone during a day time and a desired number of acquaintances gather and go around together during a night time, the information may be provided from the server 150 to the platform 1412. The platform 1412 may provide information targeted for the visitors that go around alone during a day time and information targeted for the visitors that go around together with the desired number of acquaintances during a night time based on the averaged information.

Figure 15:
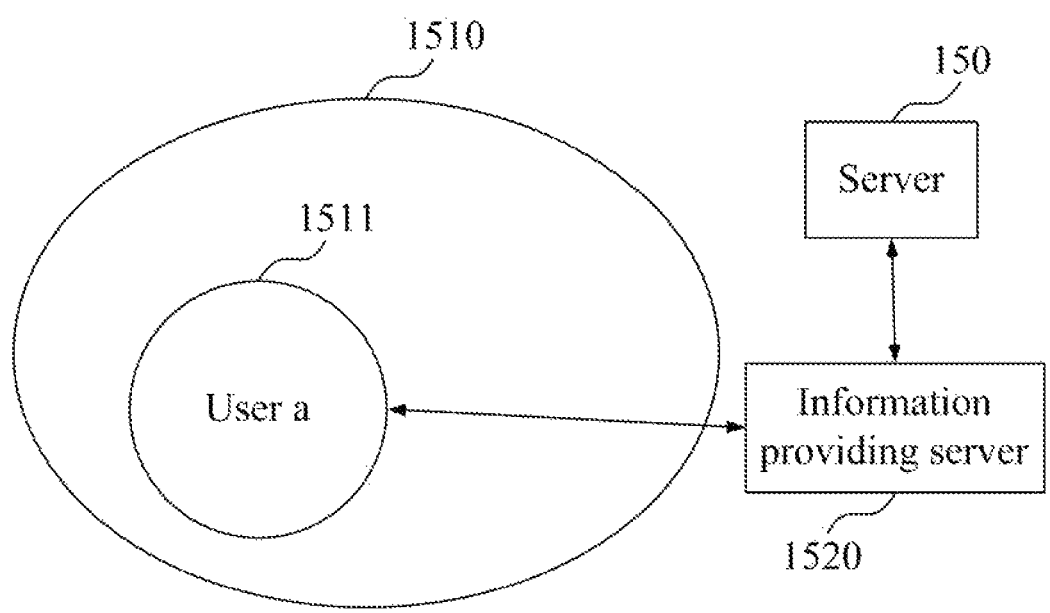
FIG. 15 illustrates an example of processing targeting of information exposed online according to at least one example embodiment.

FIG. 15 illustrates an example of processing targeting of information exposed online according to at least one example embodiment. FIG. 15 assumes a situation in which user a 1511 is present in a specific space 1510 and an information providing server 1520 communicating with a communication terminal, for example, the electronic device 110, of the user a 1511 provides information to the communication terminal of the user a 1511.

The server 150 may generate an analysis index by analyzing social network information about users present in the space 1510 and may manage the generated analysis index. The information providing server 1520 may request the server 150 for information about the user a 1511. In response to the request, the server 150 may provide the information providing server 1520 with information regarding whether the user a 1511 has visited the space 1510 alone or with other acquaintances, and how many acquaintances the user a 1511 has visited the space 1510 together with, based on the analysis index. For example, if the number of relations of the user a 1511 is 0, it can be known that the user a 1511 has visited the space 1510 alone. In response to receiving the information, the information providing server 1520 may transmit, to the communication terminal of the user a 1511, information targeted for a user going around alone, such as Are you looking for a restaurant good to have a meal alone?", If you come to XXX alone, you will get free desert", etc.

In another example, if the number of relations of the user a 1511 is 3, the user a 1511 is highly likely to have visited the space 1510 together with three acquaintances. In response to receiving the information, the information providing server 1520 may transmit, to the communication terminal of the user a 1511, information targeted for four or more users, such as "If you come to AAA restaurant together with three or more friends, one person can get a free meal.

An analysis result from the server 150 may be provided in a form of a table or a sentence for a person, etc., and may be provided in a form of a parameter preset between the server 150 and a system that receives the analysis result, such that the system may immediately perform processing corresponding to the analysis result.

The analysis index database may further include information about a group, for example, as shown in the following Table 3.

TABLE 3

| | Time 1 | | | | | |
|---|---|---|---|---|---|---|
| Space | User a | User b | User c | User d | User e | User f |
| A | 2 | 2 | 2 | 2 | 1 | 1 |
| | | | Group | | | |
| | | | Group 1 | | | |
| | | | Users b, c, d | | | |

Referring to Table 3, users b, c, and d constitute a single group in space A. Here, user a is not included in the group, and the user a has a relation with users e and f. A relation is not set between the users e and f. Here, the user a is highly likely to be a center of a corresponding meeting among the users a, e, and f. Here, if users a, b, c, d, e, and f are present in the space 1510 of FIG. 15 and the user a of Table 3 indicates the user a 1511 of FIG. 15, a relatively high effect may be achieved when the information providing server 1520 provides information to the user a, for example, the user a 1511 of FIG. 15, rather than the user e or the user f.

Also, the information providing server 1520 may transmit the same information to the users b, c, and d included in the same group at a time, based on group information. For example, the information providing server 1520 may simultaneously transmit, to the users b, c, and d, for example, communication terminals of the users b, c, and d that constitute a single group, information, such as "If three or more persons come, all of you get free drinks".

Information generated at the server 150 may be used to maintain the public order and the like. For example, governmental authority, such as police, may use relevant analysis indices associated with a space, such as a square, in which a demonstration may occur in real time in order to maintain the public order.

For example, the server 150 may monitor an index for analyzing the entire social network associated with a specific space in real time. As described above, the index (hereinafter, a first index) for analyzing the entire social network may indicate a relation setting level, for example, a community level between users present in the space. If the first index generated for the specific space is greater than or equal to a threshold value, for example, a reference value, many users present in the square may be regarded to be aware of each other, which may be regarded as a sign of demonstration. In this case, the server 150 may provide situation information about the corresponding space to a police system, a manager, and the like.

Also, the server 150 may specify a user having a largest number of relations in the space. If the demonstration occurs in reality, the server 150 may verify the user having the largest number of relations, or users within preset (or, alternatively, desired) rankings among users sorted based on the number of relations, as a person having an important position in the demonstration and may verify a location of the verified user. In this case, the server 150 may provide information, such as a profile, a location, etc., of the verified user.

The example embodiments relate to calculating an analysis index for each space and each time regarding a social network between users present in a specific space, instead of a social network between the entire users, and may perform various analysis based on the calculated analysis index.

Also, in response to providing additional information, such as a gender, an age, a matter of interest, and the like, for each user, it is possible to perform analysis in further detail by combining the provided additional information with the analysis index.

For example, it is possible to retrieve a group that includes five or more members and of which the average age is 50 ties or more. Also, it is possible to retrieve female visitors from among visitors each having three or more relations and to use information about the retrieved female visitors as related target information. Also, if a ratio of visitors having an interest about animals in association with a demonstration is relatively high, it is possible to predict an animal protection demonstration in advance. Also, it is possible to provide a service for searching for a space in which a ratio of persons going around alone, for example, a ratio of visitors having zero relation, is relatively high and the average age is 30 ties or less, to a user who desires to open a single-user restaurant targeted for young people.

An analysis result may be provided in a simple numerical value form, may be provided in a form of indicating a related numeral number on a map in interaction with a geographic information system (GIS), and may be provided in a form in which a change in a numerical value over time about a specific space is represented in a time-sequential graph, etc.

According to at least some example embodiments, it is possible to analyze social network information between users present in a desired space in real time by calculating new information through combination of location information and social network information and by analyzing a social network between users present in a corresponding space for each time based on the specific space. Also, it is possible to filter, provide, and/or recommend information, such as a space, a time, a user or a user group, etc., suitable for a variety of conditions based on social network information analyzed for each space and/or each time.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD;

magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

What is claimed is:

1. A non-transitory computer-readable medium storing program code including instructions that, when executed by one or more processors, cause the one or processors to perform operations including:
    storing and managing social network data in a social network database;
    receiving location information from a plurality of electronic devices associated with the social network data;
    specifying users of electronic devices present in a specific space at a specific time among the plurality of electronic devices;
    filtering relation information between the specified users in the social network database; and
    calculating at least one analysis index for the specific space and the specific time based on the filtered relation information,
    the calculating including determining a plurality of analysis indices by determining, for each user among the specified users, a total number of relations between the user and the other specified users for the specific space and the specific time.

2. The non-transitory computer-readable medium of claim 1, wherein the operations further include:
    filtering the specified users by extracting, from among the specified users, one or more users whose determined total number of relations is equal to or above a reference number.

3. The non-transitory computer-readable medium of claim 1, wherein the calculating of the at least one analysis index for the specific time and the specific space includes determining users having set a mutual relation among the specified users based on the filtered relation information, and calculating a relative ratio between a total number of the determined users and a total number of the specified users as the analysis index.

4. The non-transitory computer-readable medium of claim 1, wherein the calculating of the at least one analysis index for the specific time and the specific space includes calculating the maximum number of cases in which a relation is settable between the specified users, determining a first number of cases in which the relation is set between the specified users based on the filtered relation information, and calculating a ratio between the first number of cases and the maximum number of cases as the analysis index.

5. The non-transitory computer-readable medium of claim 1, wherein the operations further include:
    constructing an analysis index database by storing an analysis index calculated at desired time intervals in association with a corresponding space and time interval, with respect to each of a plurality of spaces.

6. The non-transitory computer-readable medium of claim 5, wherein the operations further include:
    generating analysis information about a first space or a first time to be analyzed, and
    the generating of the analysis information includes,
        extracting, from the analysis index database, analysis indices accumulated with respect to the first space during a desired period of time or analysis indices accumulated with respect to each of the plurality of spaces with respect to the first time;
        setting a reference index based on an average or distribution of the extracted analysis indices; and
        generating analysis information about the first space or the first time by comparing an analysis index calculated for the first space or the first time to the reference index.

7. The non-transitory computer-readable medium of claim 5, wherein the operations further include:
    generating analysis information about at least one space or at least one time to be analyzed, and
    the generating of the analysis information includes,
        extracting, from the analysis index database, analysis indices accumulated with respect to each of a plurality of time intervals in association with the at least one space or analysis indices accumulated with respect to each of the plurality of spaces in association with the at least one time; and
        generating analysis information about the at least one space or the at least one time by comparing the extracted analysis indices.

8. The non-transitory computer-readable medium of claim 1, wherein the calculating of the at least one analysis index for the specific time and the specific space includes extracting a number of relations set with the specified users from the filtered relation information with respect to each of the specified users, and generating the analysis index based on the extracted number of relations.

9. The non-transitory computer-readable medium of claim 8, wherein the operations further include:
    storing the calculated analysis index in an analysis index database in association with the specific time, the specific space, and an identifier of a corresponding user; and
    filtering users by comparing a reference value to the analysis index stored in the analysis index database.

10. The non-transitory computer-readable medium of claim 1, wherein the operations further include:
    verifying, as a single group, users of a subset in which all of the users have a mutual relation among subsets that include at least two of the specified users; and
    filtering the group by comparing a reference value to a number of users in the single group.

11. The non-transitory computer-readable medium of claim 1, wherein the calculated at least one analysis index is stored in an analysis index database in association with the specific space and the specific time, the analysis index database configured to time-sequentially manage analysis indices generated with respect to each of a plurality of spaces together with identification information about the specified users, and
    the operations further include:
        in response to an input condition, extracting, as extracted information, at least one of an analysis index, a space, a time, or identification information about users corresponding to the input condition from the analysis index database; and generating analysis information based on the extracted information.

12. The non-transitory computer-readable medium of claim 11, wherein the extracted information includes the identification information, wherein the operations further include:
managing additional information of users associated with the social network data, and wherein the generating of the analysis information includes generating the analysis information by further using additional information of a user corresponding to the identification information.

13. An analysis method comprising:

storing and managing social network data in a social network database;

receiving location information from a plurality of electronic devices associated with the social network database;

specifying users of electronic devices present in a specific space at a specific time among the plurality of electronic devices;

filtering relation information between the specified users in the social network database; and calculating an analysis index for the specific time and the specific space based on the filtered relation information, the calculating including determining a plurality of analysis indices by determining, for each user among the specified users, a total number of relations between the user and the other specified users for the specific space and the specific time.

14. The method of claim 13, further comprising:

filtering the specified users by extracting, from among the specified users, one or more users whose determined total number of relations is equal to or above a reference number.

15. The method of claim 13, further comprising:

constructing an analysis index database by storing an analysis index calculated at desired time intervals in association with a corresponding space and time interval, with respect to each of a plurality of spaces.

16. The method of claim 13, wherein the calculating the analysis index for the specific time and the specific space includes extracting the number of relations set with the specified users from the filtered relation information with respect to each of the specified users, and generating the analysis index based on the extracted number of relations.

17. The method of claim 13, further comprising:

verifying, as a single group, users of a subset in which all of the users have a mutual relation among subsets that include at least two of the specified users; and filtering the group by comparing a reference value to the number of users of the group.

18. The method of claim 13, wherein the calculated analysis index is stored in an analysis index database in association with the specific space and the specific time, the analysis index database configured to time-sequentially manage analysis indices generated with respect to each of a plurality of spaces together with identification information about the specified users, and the social network analyzing method further includes:
in response to an input condition, extracting, as extracted information, at least one of an analysis index, a space, a time, and identification information about users corresponding to the input condition from the analysis index database; and generating analysis information based on the extracted information.

19. A server comprising:

a memory configured to store computer-readable instructions; and at least one processor configured to execute the computer-readable instructions such that the at least one processor is configured to, store and manage social network data in a social network database;

receive location information from a plurality of electronic devices associated with the social network database;

specify users of electronic devices present in a specific space at a specific time among the plurality of electronic devices;

filter relation information between the specified users in the social network database; and calculate an analysis index for the specific time and the specific space based on the filtered relation information, the calculating including determining a plurality of analysis indices by determining, for each user among the specified users, a total number of relations between the user and the other specified users for the specific space and the specific time.

20. The server of claim 19, wherein the at least one processor is configured to execute the computer-readable instructions such that the at least one processor is further configured to filter the specified users by extracting, from among the specified users, one or more users whose determined total number of relations is equal to or above a reference number.

* * * * *